US007063486B2

(12) United States Patent
Reichler et al.

(10) Patent No.: US 7,063,486 B2
(45) Date of Patent: Jun. 20, 2006

(54) RESERVOIR FOR POWDERY MEDIA

(75) Inventors: Jan Reichler, Constance (DE); Erwin Hihn, Walddorfhäslach (DE)

(73) Assignee: Eisenmann Maschinenbau KG (Komplementär:Eisenmann-Stiftung), Böblingen (DE)

( * ) Notice: Subject to any disclaimer, the term of this patent is extended or adjusted under 35 U.S.C. 154(b) by 93 days.

(21) Appl. No.: 10/746,137

(22) Filed: Dec. 24, 2003

(65) Prior Publication Data

US 2004/0184888 A1 Sep. 23, 2004

(30) Foreign Application Priority Data

Dec. 27, 2002 (DE) ................................ 102 61 292

(51) Int. Cl.
*B65G 53/38* (2006.01)

(52) U.S. Cl. ....................................... 406/138; 222/195

(58) Field of Classification Search .................. 406/90, 406/138; 222/195
See application file for complete search history.

(56) References Cited

U.S. PATENT DOCUMENTS

| | | | | |
|---|---|---|---|---|
| 2,877,056 | A * | 3/1959 | Williams | 406/90 |
| 2,955,878 | A * | 10/1960 | Tolman | 406/90 |
| 3,062,589 | A | 11/1962 | Hawkinson et al. | |
| 3,093,418 | A * | 6/1963 | Doble | 406/138 |
| 3,149,884 | A * | 9/1964 | Jones | 406/138 |
| 3,179,378 | A * | 4/1965 | Zenz et al. | 366/106 |
| 3,226,166 | A * | 12/1965 | Bertolini et al. | 406/90 |
| 3,355,222 | A | 11/1967 | Neely | |
| 3,432,208 | A * | 3/1969 | Draper et al. | 406/93 |
| 3,642,178 | A * | 2/1972 | Balzau et al. | 406/90 |
| 3,768,867 | A * | 10/1973 | Krambrock | 406/126 |
| 4,153,304 | A * | 5/1979 | Haskins | 406/28 |
| 4,262,034 | A * | 4/1981 | Andersen | 427/450 |
| 4,391,860 | A | 7/1983 | Rotolico et al. | |
| 4,502,820 | A * | 3/1985 | Fujii et al. | 406/56 |
| 4,834,587 | A * | 5/1989 | Crawley et al. | 406/23 |
| 4,930,943 | A * | 6/1990 | Ahrens et al. | 406/90 |
| 4,948,013 | A | 8/1990 | Thomas et al. | |
| 5,269,463 | A * | 12/1993 | Burks | 239/85 |
| 6,776,361 | B1 * | 8/2004 | Watanabe et al. | 239/654 |

FOREIGN PATENT DOCUMENTS

| | | |
|---|---|---|
| DE | 35 31 927 A | 3/1987 |
| DE | 39 10 073 A1 | 1/1990 |
| EP | 0 438 976 A | 7/1991 |
| EP | 1 197 265 A | 4/2002 |
| FR | 1 087 426 A | 7/1953 |
| GB | 2 132 966 A | 7/1984 |

* cited by examiner

*Primary Examiner*—Joe Dillon, Jr.
(74) *Attorney, Agent, or Firm*—Watson IP Group, PLC; Jovan N. Jovanovic

(57) ABSTRACT

A reservoir for powdery media, in particular powder coating, comprises a housing having at least one inlet and at least one outlet for the powdery medium. A fluidising floor of porous, air-permeable material is located in the interior of the housing at a distance from its base. A pressure chamber which is chargeable with compressed air is located between the fluidising floor and the base of the housing. The outlet has the shape of an upwardly open funnel which is located in the lower partial zone of the housing adjacent to the fluidising floor. In this way well-mixed powdery medium the grain-size distribution of which corresponds to the maximum extent to that of the fluidised powdery medium inside the reservoir is always withdrawn.

5 Claims, 1 Drawing Sheet

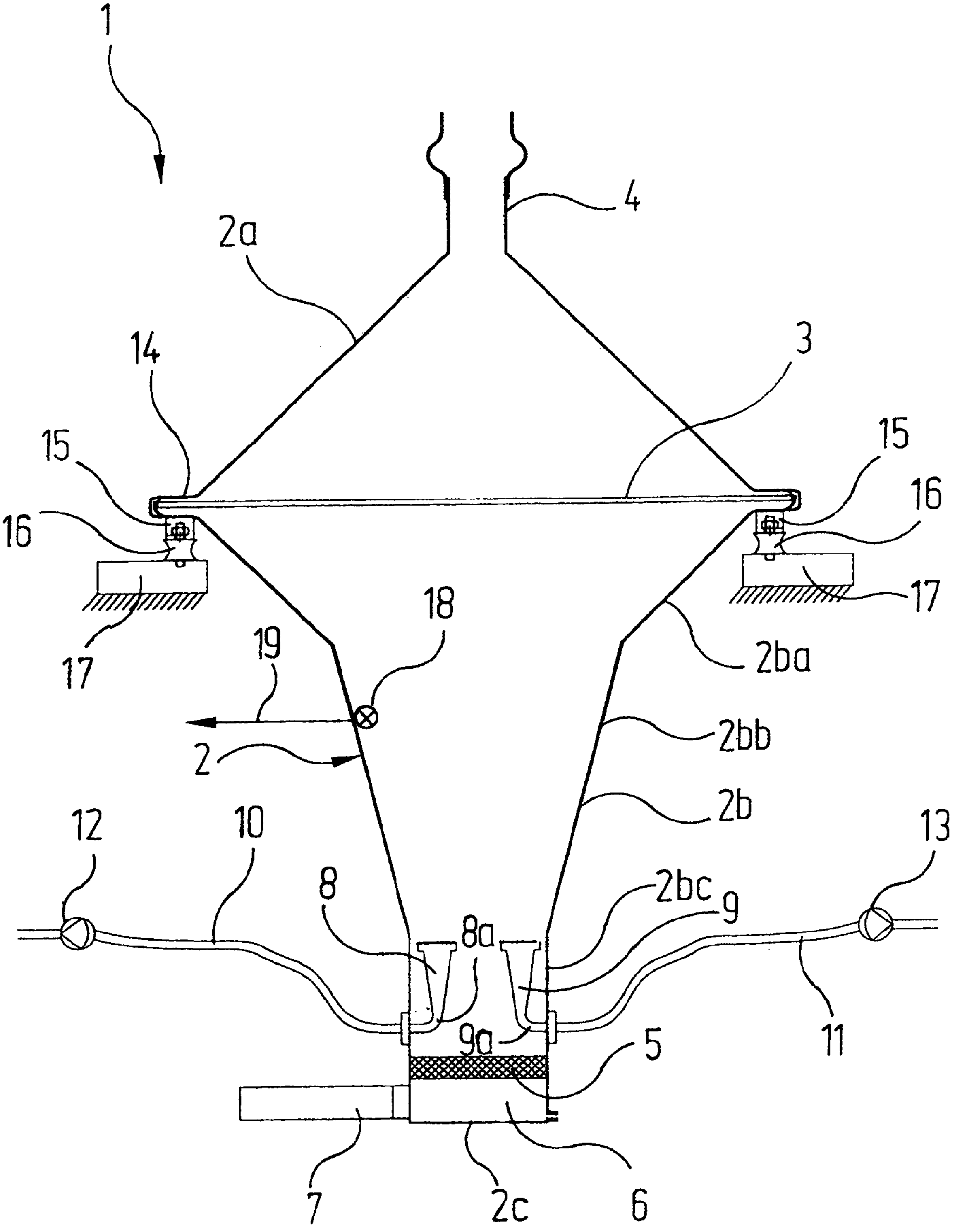
1
4
2a
3
14
15
15
16
16
17
17
18
19
2ba
2bb
2
2b
12
10
13
8
8a
2bc
9
11
9a
5
7
2c
6

RESERVOIR FOR POWDERY MEDIA

BACKGROUND OF THE INVENTION

1. Field of the Invention

The invention relates to a reservoir for powdery media, in particular for powder coating, having: (a) a housing having at least one inlet and at least one outlet for the powdery medium; (b) a fluidising floor of porous, air-permeable material arranged in the interior of the housing at a distance from its base; and (c) a pressure chamber chargeable with compressed air and located between the fluidising floor and the base of the housing.

2. Background Art

In the powder processing industry, in particular in coating technology, reservoirs for powdery media in which a given quantity of powdery medium can be temporarily stored and then withdrawn for further use are often required. Such reservoirs are to be found, for example, upstream of, downstream of or in sifting machines which are provided upstream of the application devices with which the powder coating is sprayed onto a workpiece in coating plants. The amount of sieved powder coating required for complete coating of a workpiece is generally collected in reservoirs located downstream of the sifting machine.

Known reservoirs of the above-mentioned type currently on the market have substantially cylindrical housings; the term "cylindrical" is used here in the mathematical sense to describe a geometrical form which has the same cross-section at all levels above its base. Suction pipes which are lowered from above into the interior of the housing until they are relatively close to the upper face of the fluidising floor, from where they suck the fluidised powdery medium upwardly, are used as outlets.

With the known reservoirs of the above-mentioned type there is a danger that the powdery medium withdrawn therefrom will not possess the same distribution of grain sizes as the powdery medium located inside the reservoir, so that a particular fraction of grains, whether a coarser or finer fraction, is preferentially withdrawn, depending on where the intake aperture of the suction pipe happens to be located.

Moreover, these known reservoirs have a considerable consumption of compressed air. The fluidised powdery medium located in them is also subjected to high mechanical stress, which can lead to undesired fine-grain formation. Furthermore, mixing of the fluidised powder is not always optimal. Finally, in these known reservoirs unwanted air can occasionally be sucked in through the outlet pipe from the generally pulsating fluidised bed of powder, interrupting the operation of the application devices in a manner referred to as "pumping".

It is the object of the present invention so to configure a reservoir of the above-mentioned type that the grain size distribution in the powdery medium withdrawn does not differ substantially from the grain size distribution of the powdery medium inside the reservoir, and that the grain size distribution therein remains substantially constant over time.

SUMMARY OF THE INVENTION

This object is achieved according to the invention in that the outlet has the shape of an upwardly open funnel located in the lower partial zone of the housing.

The invention makes use of the surprising discovery that the grain size distribution of the powdery medium being withdrawn from the reservoir remains substantially uninfluenced if the powdery medium is sucked off not in an ascending movement but in a descending movement.

It is especially advantageous if the cross-sectional area of the partial zone of the housing directly above the fluidising floor in which the funnel-shaped outlet is located is smaller than the cross-sectional area of the partial zone located above same. The widening of the interior of the housing towards the top produces a defined turbulence in the fluidised powdery medium, resulting in better mixing. This reduces the danger of air cavities being sucked into the system located downstream. At the same time a reduction in flow velocity is produced in the higher zones of the interior of the housing, reducing the mechanical stress on the powdery medium and therefore reducing fine-grain production. A further, desirable side-effect of this cross-sectional configuration is that the area of the fluidising floor is kept relatively small, resulting in a correspondingly reduced consumption of compressed air.

These effects are especially pronounced if the cross-sectional area of the partial zone of the housing directly above the fluidising floor has approximately one-tenth, still better approximately one-twentieth, of the maximum cross-sectional area of the housing.

The housing can be made at least partly of plastics material. Adhesions of the powdery medium to the inner walls of the housing are thereby avoided. If transparent plastics material, in particular acrylic glass, is used the movement processes of the powdery medium inside the reservoir can be visually observed and monitored.

BRIEF DESCRIPTION OF THE DRAWINGS

An embodiment of the invention is elucidated in detail below with reference to the drawing; the single FIGURE shows a vertical section through a powder coating sifting machine in which a reservoir according to the invention is integrated.

DETAILED DESCRIPTION OF THE DRAWINGS

While this invention is susceptible of embodiment in many different forms, there is shown in the drawings an described herein in detail a specific embodiment with the understanding that the present disclosure is to be considered as an exemplification of the principles of the invention and is not intended to limit the invention to the embodiment illustrated.

The sifting machine for powder coating represented in the drawing and denoted as a whole by reference numeral 1 includes a housing 2 in which a horizontal sifting floor 3 is arranged. The housing 2 has a circular external contour in all horizontal cutting planes, the diameter of which varies, however, as a function of height. The housing 2 has its largest diameter at the level of the sifting floor 3. The inlet zone **2*a* of the housing 2 located above the sifting floor 3 narrows conically towards the top, so that a conical form is produced. At the top of the inlet zone 2*a* an inlet pipe connection 4 through which powder coating can be fed opens into the interior of the housing 2**.

The outlet zone **2*b* of the housing 2 located below the sifting floor 3 serves as a powder reservoir for the application devices located downstream, as will be clarified below. The outlet zone 2*b* can in turn be divided from above to below into three partial zones 2*ba*, 2*bb* and 2*bc*. The upper partial zone 2*ba* adjacent to the sifting floor 3 tapers conically towards the bottom with a comparatively small cone angle with respect to the horizontal. The partial zone 2*bb*** adjoining the partial zone 2*ba* is also conical, although the cone angle included with the horizontal is considerably larger. Finally, the lowest zone 2*bc* of the outlet zone 2*a* is in the form of a circular cylinder. The cross-sectional area of the housing 2 in the bottom cylindrical portion 2*bc* is only approx. $1/23$ of the cross-sectional area of the housing 2 in the region of the sifting floor 3.

At a certain distance above the base 2*c* of the housing 2 a horizontal fluidising floor 5 passes through the interior of the lowest partial zone 2*bc*. In this way a pressure chamber 6 into which a feed line 7 for compressed air opens is formed below said fluidising floor 5.

Arranged above the fluidising floor 5, but still substantially within the cylindrical lower partial zone 2*bc* of the housing 2, are two suction funnels 8, 9 which are widened towards the top and have upwardly-facing inlet apertures. The suction funnels 8, 9 are provided with respective rigid, integrally moulded line sections 8*a*, 9*a* which pass through the cylinder wall of the partial zone 2*bc* of the housing 2, where they are connected to hoses 10, 11. The hoses 10, 11 lead to respective powder pumps 12, 13 and from there to application devices (not shown in the drawing), for example, powder bells with which the powder is sprayed onto a workpiece.

In the region of the sifting floor 3 the housing 2 has a radially projecting, annular flange 14. This flange 14 rests with its underside on a plurality of load cells 15 distributed around its periphery, which in turn bear via rubber buffers 16 against a fixed support 17.

Finally, a level sensor 18, which in principle can be of any known construction, is mounted in the interior of the outlet zone 2*b* of the housing 2. The electrical signal generated by this level sensor 18 is supplied via a line 19 to a computer which controls the entire sifting machine 1.

The above-described sifting machine 1 operates as follows: Before the start of a coating process a quantity of powder coating as required to completely coat a workpiece is metered into the interior of the inlet zone 2*a* by means of a metering valve (not shown). This quantity of coating can be monitored by means of the load cells 15 on which the entire sifting machine 1 is supported. Because the sifting floor 3 is of comparatively large area the powder quantity dispensed on to it is distributed; sifting into the outlet zone 2*b* located below the sifting floor 3 therefore takes place relatively quickly.

The sifted powder reaching the outlet zone 2*b* completely fills the bottom partial zone 2*bc* located above the fluidising floor 5, together with the middle partial zone 2*bb* and optionally also the partial zone 2*ba* adjacent to the sifting floor 3 up to a given level. Because of the smaller cross-sectional areas of the partial zones 2*bc*, 2*bb* and 2*ba* in the outlet zone 2*b*, the powder coating located therein extends considerably higher than in the inlet zone 2*a* above the sieve 3.

The sifting process is correctly completed when the level sensor 18 in the outlet zone 2*b* of the housing 2 detects the level which corresponds substantially to the complete volume of coating dispensed via the inlet pipe connection 4.

The pressure chamber 6 below the fluidising floor 5 is supplied with compressed air via the feed line 7, which compressed air passes upwardly through the fluidising floor 5 and fluidises the powder coating in known fashion. Said powder is therefore constantly in motion. Because of the funnel shape of the conical partial zones 2*bb* and 2*ba*, the flow of powder coating in these partial zones additionally takes on a defined turbulence component which ensures that good mixing of all grain sizes takes place in the powder coating. Because the partial zones 2*bb* and 2*ba* are widened conically towards the top, the flow velocity of the powder coating also decreases in those areas, imposing less stress on the powder coating and thus ensuring reduced fine-grain formation.

Once the sifting process is completed, that is, once substantially the entire metered quantity of powder coating has passed through the sifting floor 3, the coating process can begin. For this purpose the pumps 12 and 13 in the hoses 10, 11 are activated. The fluidised powder coating is now sucked substantially out of the conical partial zones 2*bb* and optionally 2*ba* of the outlet zone 2*b* of the sifting machine 1. With the above-described orientation of the suction funnels 8 in which the suction aperture faces upwards and the suction process takes place from above to below, an especially homogeneous mixture of powder coating is withdrawn, which mixture also contains, in particular, a fine-grain proportion which corresponds to the fine-grain proportion in the entire quantity of powder coating located in the outlet zone 2*b* and circulating therein.

Because of the shape and orientation of the suction funnels 8, 9, air cavities produced even under very unfavourable conditions cannot be sucked in.

On completion of the coating process the work cycle of the sifting machine 1 begins anew with the weighing-in of a new portion of powder coating into the inlet zone 2*a*.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. Reservoir for powdery media comprising:

a) a housing including a base, an interior, at least one inlet and at least one outlet for a powdery medium;

b) a fluidising floor of porous, air-permeable material arranged in the interior of the housing at a distance from the base thereof; and c) a pressure chamber chargeable with compressed air and located between the fluidising floor and the base of the housing, wherein the at least one outlet has the shape of an upwardly open funnel located in a lower partial zone of the housing; and means for reducing compressed air consumption and increasing homogeneity of said powdery medium wherein the cross-sectional area of the housing in the region of the fluidizing floor is substantially one of less than equal and to approximately one-tenth of the maximum cross-sectional area of the housing.

2. Reservoir according to claim 1, wherein the cross-sectional area of the lower partial zone of the housing directly above the fluidising floor is substantially one of less than and equal to approximately one-twentieth of the maximum cross-sectional area of the housing or less.

3. Reservoir according to claim 1, wherein the housing is made at least partially of a plastics material.

4. Reservoir according to claim 3, wherein the housing is made at least partially of a transparent plastics material.

5. Reservoir according to claim 4, wherein the transparent plastics material comprises acrylic glass.

* * * * *